(12) United States Patent
Niem et al.

(10) Patent No.: US 11,485,373 B2
(45) Date of Patent: Nov. 1, 2022

(54) METHOD FOR A POSITION DETERMINATION OF A VEHICLE, CONTROL UNIT, AND VEHICLE

(71) Applicant: Robert Bosch GmbH, Stuttgart (DE)

(72) Inventors: Wolfgang Niem, Hildesheim (DE); Hanno Homann, Hannover (DE); Jan Wolter, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 16/761,963

(22) PCT Filed: Oct. 16, 2018

(86) PCT No.: PCT/EP2018/078267
§ 371 (c)(1),
(2) Date: May 6, 2020

(87) PCT Pub. No.: WO2019/110179
PCT Pub. Date: Jun. 13, 2019

(65) Prior Publication Data
US 2021/0188292 A1    Jun. 24, 2021

(30) Foreign Application Priority Data
Dec. 4, 2017  (DE) .......................... 102017221839.8

(51) Int. Cl.
*B60W 50/00* (2006.01)
*G06V 10/75* (2022.01)
(Continued)

(52) U.S. Cl.
CPC ........... *B60W 50/00* (2013.01); *G06V 10/751* (2022.01); *G06V 20/13* (2022.01); *G06V 20/56* (2022.01);
(Continued)

(58) Field of Classification Search
USPC ............................................................. 701/1
See application file for complete search history.

(56) References Cited

U.S. PATENT DOCUMENTS

2008/0205706 A1   8/2008  Hongo
2009/0268027 A1*  10/2009 Yang ...................... G08G 1/167
                                                          348/148
(Continued)

FOREIGN PATENT DOCUMENTS

DE       10351778 A1    6/2005
DE    102012013492 A1    1/2013
DE    102016200656 A1    7/2017

OTHER PUBLICATIONS

International Search Report for PCT/EP2018/078267, dated Jan. 24, 2019.
(Continued)

*Primary Examiner* — Tyler D Paige
(74) *Attorney, Agent, or Firm* — Norton Rose Fulbright US LLP; Gerard Messina

(57) ABSTRACT

A method for a position determination of a vehicle, at least one camera and one sensor unit for a global satellite navigation system being situated on the vehicle. The method
(Continued)

includes: acquiring at least one camera image of the environment of the vehicle with the aid of the camera, generating a transformed image as a function of the acquired camera image, with the transformed image having a virtual perspective pointing perpendicularly in the downward direction, determining a satellite position of the vehicle through a satellite-based position determination, and providing an aerial image of the environment of the vehicle as a function of the determined satellite position. A detection of a position of the transformed image in the supplied aerial image, and an ascertainment of a vehicle position as a function of the detected position of the transformed image in the supplied aerial image take place subsequently.

10 Claims, 10 Drawing Sheets

(51) Int. Cl.
   *G06V 20/13*     (2022.01)
   *G06V 20/56*     (2022.01)
(52) U.S. Cl.
   CPC ............... *B60W 2050/0075* (2013.01); *B60W 2420/403* (2013.01); *B60W 2420/52* (2013.01); *B60W 2556/50* (2020.02)

(56) References Cited

U.S. PATENT DOCUMENTS

| | | |
|---|---|---|
| 2011/0001826 A1 | 1/2011 | Hongo |
| 2013/0321398 A1* | 12/2013 | Howard ................... G06T 17/20 345/419 |
| 2015/0227775 A1 | 8/2015 | Lewis et al. |
| 2017/0102467 A1* | 4/2017 | Nielsen ................... G01S 19/47 |

OTHER PUBLICATIONS

Masafumi Noda et al., "Vehicle Ego-Localization by Matching In-Vehicle Camera Images to an Aerial Image", In: Serious Games, Cham, Springer International Publishing, vol. 6469, 2011, pp. 163-173. XP055541572.

Gianpaolo Conte et al., "An Integrated UAV Navigation System Based on Aerial Image Matching", Proceedings of The 2008 IEEE Aerospace Conference, 2008, pp. 1-10. https://www.ida.liu.se/divisions/aiics/publications/aeroconf-2008-integrated-uav-navigation.pdf XP055541531.

Nida M. Zaitoun & Musbah J. Aqel, "Survey on Image Segmentation Techniques", In: Procedia Computer Science 65, 2015, pp. 797-806.

J. Redmon & A. Farhadi, "YOLO9000: Better, Faster, Stronger", 2016, pp. 1-9. ARXIV:1612.08242V1.

"Image Registration" in Wikipedia, URL: "https://en.wikipedia.org/w/index.php?title=Image_registration&oldid=980173707", accessed Nov. 11, 2020, pp. 1-6.

* cited by examiner

METHOD FOR A POSITION DETERMINATION OF A VEHICLE, CONTROL UNIT, AND VEHICLE

FIELD

The present invention relates to a method for a position determination of a vehicle, a control unit for carrying out the method, and a vehicle having such a control unit.

BACKGROUND INFORMATION

U.S. Patent Application Pub. Nos. US 2008/205706 A1 and US 2011/001826 A1 describe an ascertainment of a transformed image as a function of a camera image acquired by a camera, with the camera being located inside a vehicle. The transformed image has a modified perspective in comparison with the acquired camera image, in particular a bird's eye perspective or a virtual perspective from an observer standpoint that is located above the vehicle with a viewing direction from above toward below onto the vehicle or the road.

German Patent No. DE 103 51 778 A1 describes a pixelwise calculation of signature strings or a features, in which the signature string allocated to a pixel describes an environment of the pixel in each case.

Moreover, the ascertaining of objects and/or segments in an image is conventional in image processing (see, for example, Nida M. Zaitoun & Musbah J. Aqel (2015), Survey on Image Segmentation Techniques in: Procedia Computer Science 65, p. 797-806, and J. Redmon & A. Farhadi (2016) YOLO9000; Better, Faster, Stronger in: arXiv: 1612.08242v1 [cs.CV])). A method for analyzing an environment of a vehicle in which a distance measurement is carried out with the aid of a first active sensor is described in German Patent Application No. DE 10 2016 200 656 A1. The active sensor is an ultrasonic sensor, a radar sensor or a LiDAR sensor, for example. The method, for instance, ascertains a distance between a vehicle and a first environment object.

The ascertaining of a current traffic lane on a multi-lane road is unable to be reliably determined by a satellite-based position determination on account of the insufficient precision of 1-10 m of the satellite-based position determination.

SUMMARY

The present invention relates to a method for a position determination of a vehicle. At least one camera and one sensor unit for a global satellite navigation system are situated on the vehicle. In accordance with the present invention, an example present method includes an acquisition of at least one camera image of the environment of the vehicle with the aid of the camera. A transformed image is then generated as a function of at least one section of the acquired camera image, in which case the section of the acquired camera image in particular may have any kind of shape and/or possibly encompass a plurality of unrelated areas of the camera image. For instance, the transformed image is generated as a function of detected object-free areas in the camera image as a section of the camera image, in particular of detected horizontal road surfaces. It may advantageously be provided that the transformed image is additionally generated as a function of a digital terrain model, the terrain model being loaded as a function of an acquired satellite position of the vehicle. The transformed image represents a view from a virtual observer standpoint from a downward-pointing perspective onto a surface of a driving route of the vehicle or it has an especially perpendicular, downward-pointing virtual perspective. In other words, when the transformed image is generated as a function of the acquired camera image, the observer perspective of the camera or the camera image is computationally modified into a virtual perspective, i.e., the display of the image content of the transformed image is modified or displaced in comparison with the acquired camera image. The virtual observer standpoint in particular lies above the vehicle, and the virtual perspective is pointing downward onto the environment of the vehicle. The transformed image is advantageously generated as a function of at least a portion of the acquired camera image and a transformation matrix, i.e., an allocation between the pixels of the transformed image to the pixels of the acquired camera image. In a further method step, a satellite position of the vehicle is determined through a satellite-based position determination. This is followed by the supply of an aerial image of the environment of the vehicle as a function of the determined satellite position. Next, a position of at least a portion of the transformed image in the supplied aerial image is detected. The detection of the position is implemented as a function of the image information of the pixels, for example. Depending on the detected position of the transformed image in the supplied aerial image, a vehicle position is subsequently ascertained. Since the local relationship between the vehicle and the camera image is known because of the fixed mounting location of the camera on the vehicle, a more precise vehicle position in comparison with the satellite-based position determination is advantageously determined with the aid of the present method. For example, using the example method according to the present invention, the current traffic lane on a multi-lane road is advantageously determined as a function of the determined vehicle position. In an advantageous manner, the present method may be carried out when the vehicle is located in the vicinity of danger zones, e.g., the tail end of congestion detected in the camera image, or when the vehicle has a satellite position that is allocated to a danger zone, e.g., at intersections, on- and off-ramps of highways, with potholes present in the road surface, schools and/or zebra crossings. Danger zones may have structural markings and/or color markings to improve the present method, so that the position of at least a portion of the transformed image in the provided aerial image is reliably detected because these markings are uniquely identified in the camera image or the transformed image and also in the aerial image.

In one further development of the present invention, an adaptation of the transformed image and/or the aerial image is carried out. For example, the adaptation is realized by converting the transformed image and the aerial image into a grayscale image and/or by adapting a brightness of the aerial image to the transformed image. Because of these adaptations, the position of the transformed image in the supplied aerial image is detected in a more reliable manner because the effect of different times of day or light conditions, for example, is reduced. In an advantageous manner, the transformed image and/or the supplied aerial image is/are scaled by the adaptation, with the scaling possibly being carried out as a function of detected objects and/or segments, for instance, see also the following comments.

In addition, in accordance with the present invention, the generation of the transformed image is preferably carried out as a function of a digital terrain model of the environment, with the terrain model being loaded as a function of the determined satellite position. In this specific embodiment, the advantage is derived that only virtually horizontal regions of the environment are imaged in the transformed image, which are easily detectable in the aerial image, so that in this embodiment the position of at least a portion of the transformed image in the supplied aerial image is detected in a more reliable manner and/or the processing power for detecting the position is reduced.

One preferred specific embodiment of the present invention provides for a pixelwise ascertainment of an environmental variable as a feature of the respective pixel in the transformed image and the supplied aerial image. For example, when the environmental variable of a pixel or the feature of the pixel is ascertained, a numerical value, for example, which describes the respective environment of the pixel or the image information of the adjacent pixels, is calculated for each pixel of the transformed image and the provided aerial image. In an advantageous manner, a pixelwise calculation of signature strings as described in German Patent No. DE 103 51 778 A1, for instance, is carried out. In this particular specific embodiment, the detection of the position of the transformed image in the aerial image is realized as a function of an allocation of at least two features ascertained in the transformed image or environmental variables to the environmental variables ascertained in the transformed image. This allocation may be implemented by a correspondence analysis, the correspondence analysis being from an optical flow calculation, for instance, or a stereoscopic evaluation of two images. The detection of the position as a function of ascertained features or environmental variables which describe the respective environment of a pixel is advantageously rapid and precise.

In one further development of the present invention, an ascertainment of first segments in the transformed image and an ascertainment of second segments in the provided aerial image may be performed using a segmentation method. Segmentation methods subdivide an image, typically into regions that share similar image characteristics; for example, an image in an ascertained segment has a similar color value and/or a similar surface texture. For instance, a road surface or a house or a fence in the environment of the vehicle is ascertained as a function of the color value, as a first segment in the transformed image, and/or as a second segment in the aerial image, each having a characteristic segment form, e.g., a road form. In this specific embodiment, the detection of the position of the transformed image in the aerial image takes place as a function of an allocation of the at least one first segment to a second segment. A first segment, for instance, is advantageously allocated to a second segment as a function of the color values in the segments and/or the surface textures of the segments. In an advantageous manner, the position of the transformed image in the aerial image is then detected as a function of a first form of the first segment and a second form of the second segment. In an advantageous manner, the position determination as a function of ascertained first and second segments, in particular as a function of a form of the respective segments, is very precise.

In addition, in accordance with the present invention, an ascertainment of first stationary objects in the acquired camera image or in the transformed image and an ascertainment of second stationary objects in the provided aerial image preferably take place by an object detection in each case. Stationary objects, for example, are buildings, parts of the road infrastructure, in particular traffic lights, bus stops and traffic signs and/or trees or plants. Next, the detection of the position of the transformed image in the aerial image as a function of an allocation of the at least one first object to a second object is performed. Detected stationary objects have a fixed distance from one another so that the detected position of the transformed image in the aerial image as a function of an allocation of the at least one first object to a second object is advantageously very precise.

In a further development of the present invention, a depth map of the environment of the vehicle is acquired with the aid of distance sensors. The distance sensors are set up to sense a distance between the vehicle and objects in the environment. The distance sensors are advantageously ultrasonic sensors, LiDAR sensors, and/or radar sensors. Next, contours and/or objects in the environment of the vehicle are ascertained as a function of the acquired depth map. In this further development, the detection of the position of the transformed image in the aerial image is additionally carried out as a function of an allocation of the ascertained contours in the depth map and/or an allocation of an object ascertained in the depth map to at least one ascertained second object and/or one ascertained second segment in the aerial image. This provides the advantage that a distance to a building or to a guiderail of a superhighway, for example, is acquired and the detection of the position of the transformed image in the aerial image or the ascertainment of the vehicle position as a function of the detected distance to the building or the guiderail is determined. The ascertained vehicle position is very precise in this further development.

The present invention also relates to a control unit. An example control unit according to the present invention is set up to carry out the example method for a position determination of the vehicle. To this end, the control unit acquires the at least one camera image of the environment of the vehicle using the at least one camera. In addition, with the aid of a processing unit, the control unit generates the transformed image as a function of at least a portion of the at least one acquired camera image. The transformed image is calculated by the processing unit, advantageously as a function of a transformation matrix, which in particular is determined by a previously performed calibration, and as a function of the acquired camera image. The calculation of the transformed image is especially carried out by a rearrangement of the pixels of the acquired camera image and scaling of the acquired camera image, which means that the transformed image has a changed view or a changed perspective in comparison with the camera image, in particular from a different observer standpoint and under a different viewing angle. In addition, using the sensor unit, the control unit determines the satellite position of the vehicle through a satellite-based position determination, and provides an aerial image of the environment of the vehicle as a function of the detected satellite position with the aid of an electronic memory. The aerial images stored in the electronic memory are advantageously updated at regular time intervals. Next, the control unit uses the processing unit to ascertain the vehicle position, in particular the vehicle coordinates, as a function of the detected position of the transformed image in the supplied aerial image.

In an optional development, the control unit is able to acquire the camera image with the aid of an infrared camera as the camera. This development offers the advantage that many stationary objects such as buildings or trees are able to be accurately identified even under poor weather conditions, e.g., at night or when it is raining.

In one preferred further development, the control unit generates an output signal, and the output signal is configured to indicate the ascertained vehicle position and/or to supply the ascertained vehicle position to a vehicle control. This offers the advantage that the more precisely ascertained vehicle position is advantageously further processed, so that the vehicle control becomes more precise and reliable, i.e., becomes safer for a driver of the vehicle, for instance.

It may be provided in accordance with the present invention that the control unit acquires a depth map of the environment of the vehicle with the aid of distance sensors, the distance sensors being ultrasonic sensors, LiDAR sensors and/or radar sensors, for instance. In this embodiment, the processing unit of the control unit ascertains contours and/or objects in the environment of the vehicle as a function of the acquired depth map. In an advantageous manner, the control unit additionally ascertains the vehicle position as a function of an allocation of the ascertained contours in the depth map and/or an object ascertained in the depth map to at least one second object and/or one second segment in the aerial image.

The present invention also relates to a vehicle having an example control unit according to the present invention.

Additional advantages result from the following description of exemplary embodiments with reference to the figures.

DETAILED DESCRIPTION OF EXAMPLE EMBODIMENTS

Figure 1:
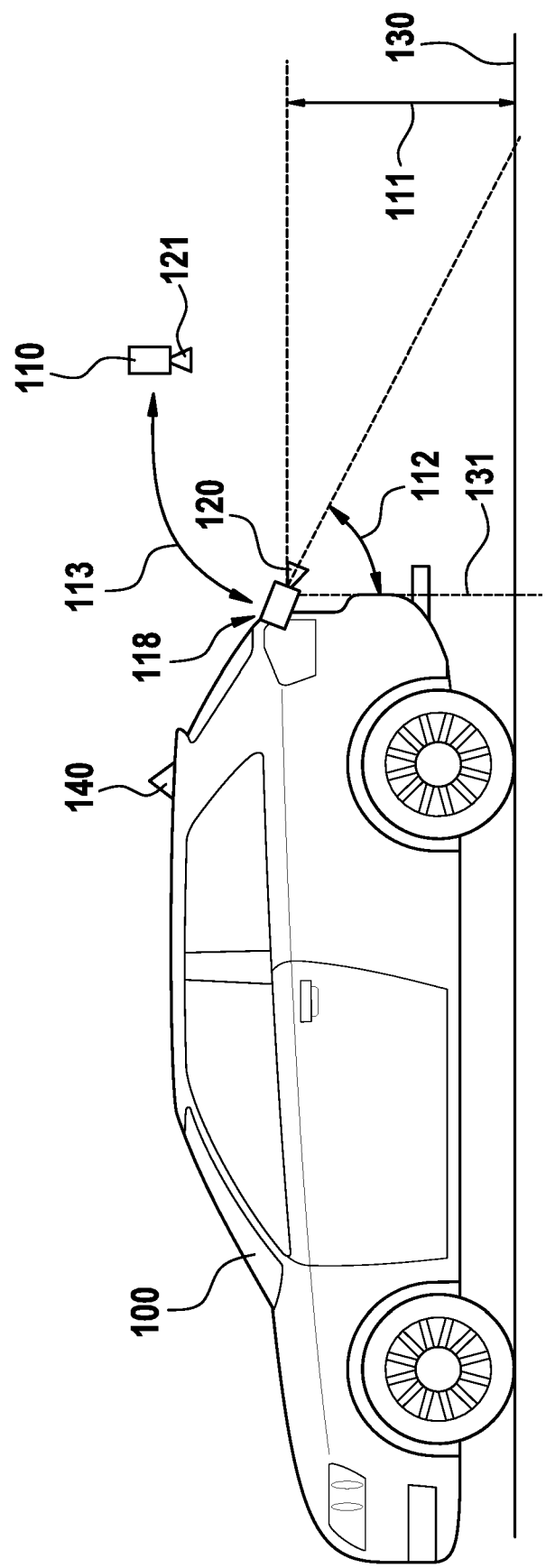
FIG. 1 shows a side view of a vehicle.

FIG. 1 shows a side view of a vehicle 100 against the backdrop of a surface of a driving route 130. A camera 110, fixedly mounted on vehicle 100, views the environment of vehicle 100 or the surface of driving route 130 from a backward-pointing perspective 120. Alternatively, camera 110 could also point toward the front or the side. It is also possible to place a plurality of cameras 110 on the vehicle. Camera 110 shown in FIG. 1 is situated at a height 111 above the surface of driving route 130 on vehicle 100 and has a viewing angle 112 in relation to the vertical 131. Viewing angle 112 of camera 110 in relation to vertical 131 preferably amounts to 30-110°. Camera 110 on vehicle 100 has a wide-angle lens, for instance, so that camera 110 acquires a large portion of the environment of vehicle 100 situated behind vehicle 100 from perspective 120. Depending on the camera image recorded by camera 110, a transformed image from a virtual perspective 121 is generated or ascertained through a computational transformation 113, this being accomplished with the aid of a control unit 400. The ascertainment of the transformed image by the computational transformation is performed using a transformation matrix, for instance, in particular by a rearrangement or displacement of the pixels of the acquired camera image and scaling of the acquired camera image, so that the transformed image has a changed view or a changed perspective 121 in comparison with the camera image, in particular from a different observer standpoint and a different viewing angle. The changed and ascertained virtual perspective 121 in comparison with the acquired camera image is preferably a perspective from an observer standpoint that is located above the vehicle and has a viewing direction perpendicular toward below onto the surface of driving route 130. Moreover, vehicle 100 includes a sensor unit 140 for a global satellite navigation system.

Figure 2:
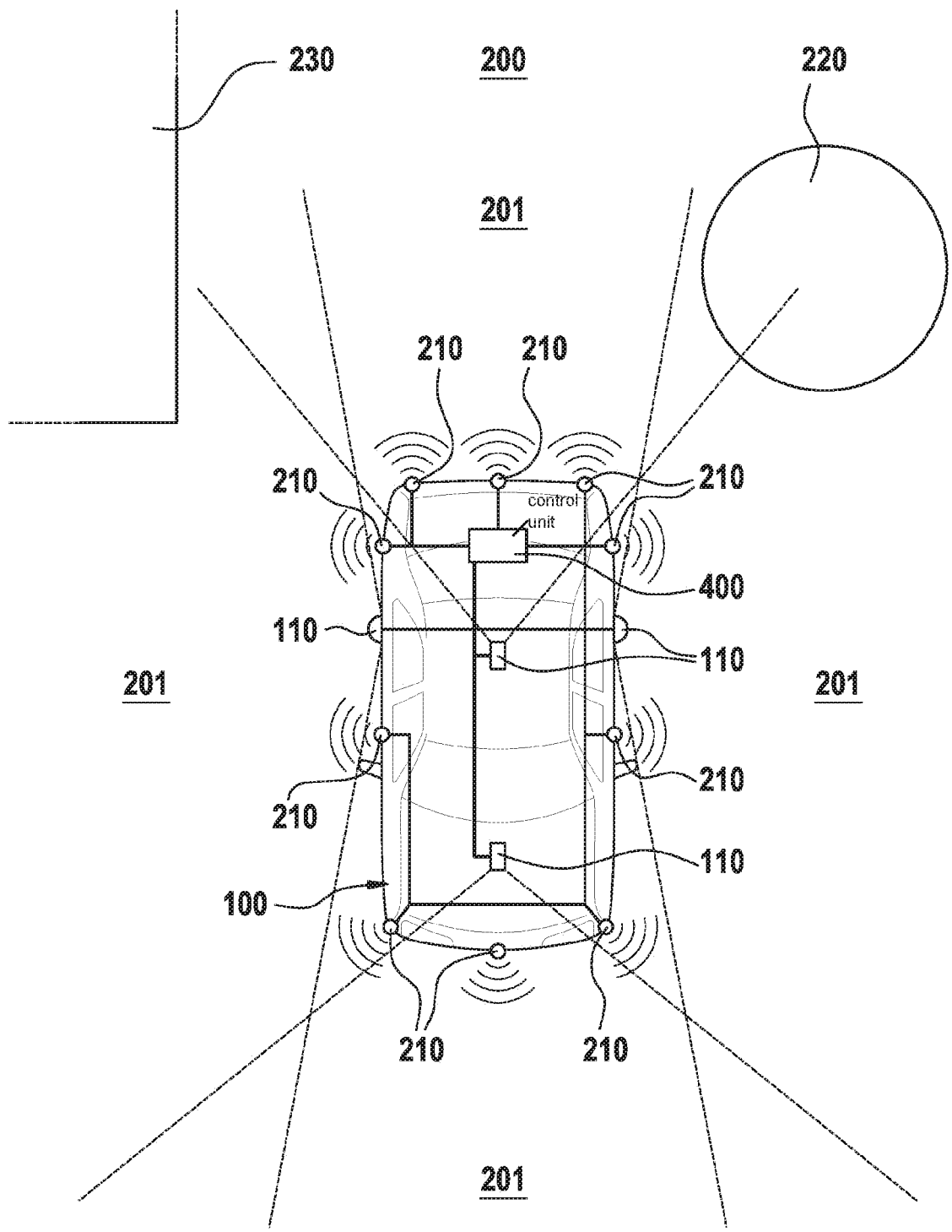
FIG. 2 shows a vehicle having four cameras and ultrasonic sensors.

FIG. 2 shows a vehicle 100 having four cameras 110, one camera 110 in each case being directed and positioned toward the front, back, and the left or right in the driving direction. The camera images acquired by cameras 110 detect regions 201 of environment 200. Accordingly, environment 200 of vehicle 100 is able to be detected virtually in its entirety from perspectives 120 of cameras 110. In addition, a plurality of ultrasonic sensors or distance sensors 210 are situated on the vehicle in FIG. 2. Distance sensors 210 are set up to sense a distance between vehicle 100 and objects that are located in the closer environment of vehicle 100. Cameras 110 and ultrasonic sensors 210 are connected to control unit 400 of vehicle 100 with the aid of data lines. Using control unit 400, a method for a position determination of a vehicle is carried out. For this purpose, control unit 400 generates the transformed image as a function of the acquired camera images from cameras 110. Control unit 400 optionally generates or ascertains a depth map of environment 200 of vehicle 100 as a function of the acquired data of ultrasonic sensors 210. Contours or outlines of objects 220 and 230 are detectable in this depth map. These objects, for instance, are objects of the road infrastructure, such as curbstones and/or traffic lights and/or stationary objects in the environment of the road or vehicle 100. For instance, a tree 220 and/or a house 230 is/are therefore optically detected in sensed regions 201 with the aid of camera 110 and optionally also by distance sensors 210. The reliability of an object detection as a function of the camera images or the transformed image, and/or an object detection as a function of the sensed distances or the depth map depends on the time of day and/or the brightness and the weather conditions in each case.

Figure 3:
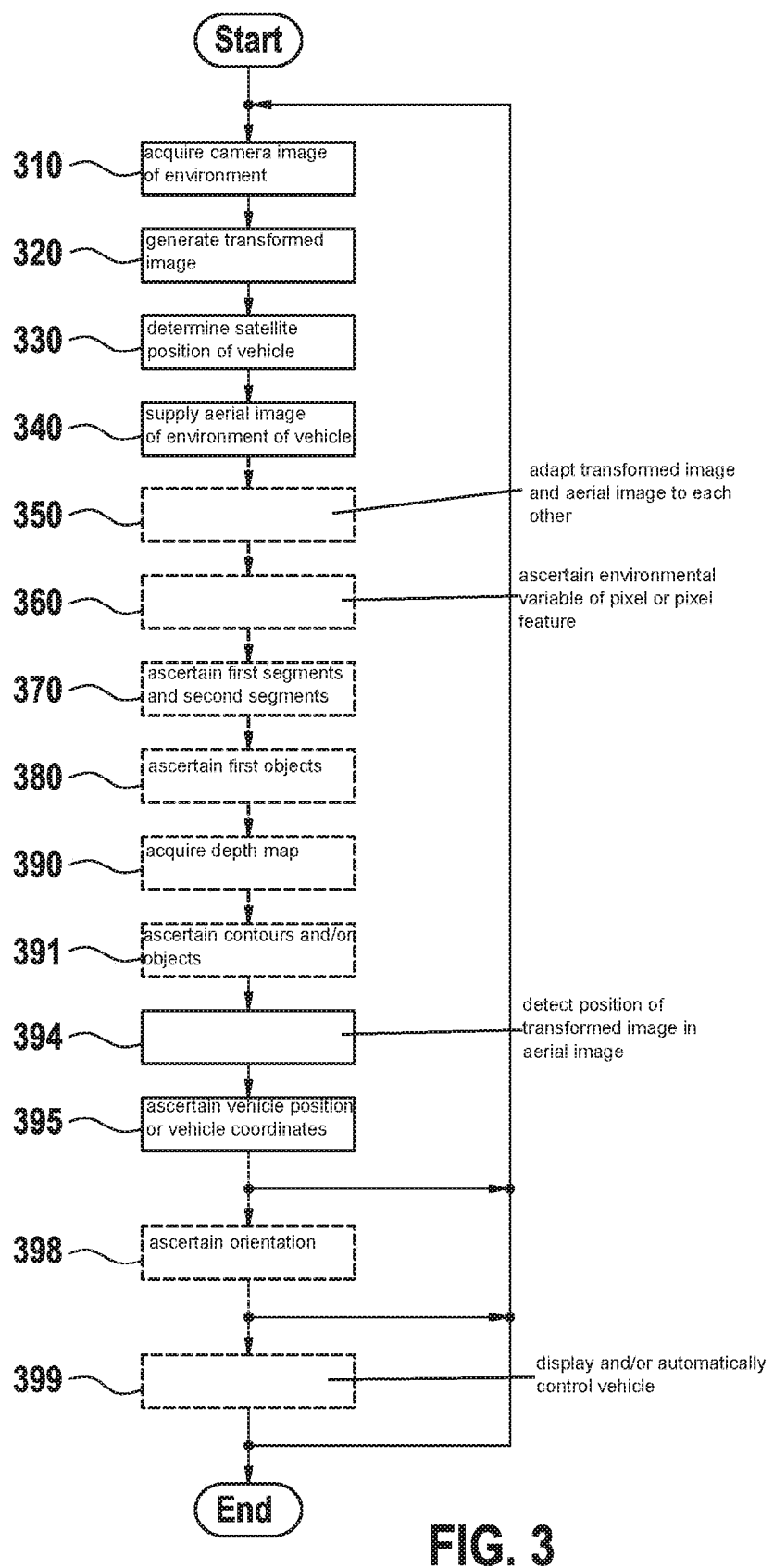
FIG. 3 shows a method sequence for a position determination in the form of a block diagram.

FIG. 3 shows a sequence of an example method for a position determination according to the present invention. To begin with, an acquisition 310 of at least one camera image 600 of environment 200 of vehicle 100 takes place with the aid of the at least one camera 110. Preferably, environment 200 of vehicle 100 is acquired virtually in its entirety with the aid of a plurality of cameras 110, which are disposed on vehicle 100. Next, in step 320, a transformed image 700 is generated as a function of the at least one section of at least one acquired camera image 600. Transformed image 700 is preferably a view from an observer standpoint located above the vehicle with a virtual perspective 121 directed perpendicular in the downward direction onto the surface of driving route 130. Perspective 121 may alternatively also have a slight downward-slanting angle and be directed toward the surface of driving route 130. Transformed image 700 is advantageously generated through a computational transformation 113 of the acquired camera image. Transformation 113 is preferably carried out pixel by pixel using a coordinate transformation according to a look-up table or matrix since an installation height and a perspective 120 or a visual angle of camera 110 is/are known. This is followed by a determination 330 of a satellite position of vehicle 100. The satellite position of vehicle 100 is ascertained by a satellite-based position determination using sensor unit 140 for a global satellite navigation system, e.g., by the GPS method. Next, in a step 340, an aerial image 800 of the environment of vehicle 100 is supplied from an electronic memory as a function of the determined satellite position. In step 350, transformed image 700 and/or aerial image 800 then is/are optionally adapted to each other. Adaptation 350, for instance, is performed by converting transformed image 700 and/or aerial image 800 into a grayscale image and/or by adapting the brightness of aerial image 800 to transformed image 700. In addition, scaling of transformed image 700 and/or aerial image 800 may be provided. Next, an ascertainment 360 of an environmental variable of a pixel or a pixel feature in transformed image 700 and supplied aerial image 800 may optionally take place. Ascertainment 360 of the pixel feature is performed separately for each pixel, for instance. Accordingly, a feature is allocated to each pixel of transformed image 700 and supplied aerial image 800, the feature describing the respective environment of the pixel, e.g., in the form of a signature string according to the document DE 103 51 778 A1. Optionally, an ascertainment 370 of first segments in transformed image 700 and of second segments in supplied aerial image 800 may take place using a segmentation method. In addition, an ascertainment 380 of first objects in acquired camera image 600 or in transformed image 700 and of second objects in supplied aerial image 800 may optionally be carried out through an object detection. Methods for a segmentation detection and/or an object detection, for instance with the aid of neural networks, are available in image processing. Moreover, the depth map of the environment of vehicle 100 is optionally able to be generated. Optional acquisition 390 of the depth map is carried out with the aid of distance sensors, in particular ultrasonic sensors, which are set up to sense a distance between the vehicle and objects in the environment. In a step 391, contours and/or objects as well as their position in the environment of the vehicle are able to be ascertained as a function of the depth map. The generated depth map may be two-dimensional or three-dimensional. According to the present invention, a detection 394 of the position of transformed image 700 in supplied aerial image 800 is subsequently performed. This detection 394 of the position of transformed image 700, for instance, is carried out as a function of an allocation or a correspondence formation of at least two pixel features, ascertained in transformed image 700, to pixel features ascertained in aerial image 800. Detection 394 of the position of transformed image 700 in aerial image 800 may alternatively or additionally be performed as a function of an allocation of the at least one first segment to a second segment and/or an allocation of the at least one first object to a second object. Moreover, detection 394 of the position may alternatively or additionally be realized by an allocation of the ascertained contours in the depth map, and/or of an object ascertained in the depth map, to at least one second object and/or a second segment in aerial image 800. Next, an ascertainment 395 of vehicle position 1000 or vehicle coordinates 1000 is carried out as a function of the detected position of transformed image 700 in aerial image 800. The present method is preferably carried out continuously, i.e., vehicle coordinates 1000 are updated on a continuous basis. Optionally, an orientation 398 of vehicle 100 is additionally able to be ascertained as a function of the detected position of transformed image 700 in provided aerial image 800. Moreover, in step 399, ascertained vehicle position 1000 and/or the ascertained orientation of vehicle 100 is/are optionally able to be displayed and/or provided to a vehicle control for an at least partially automated control of vehicle 100.

Figure 4:
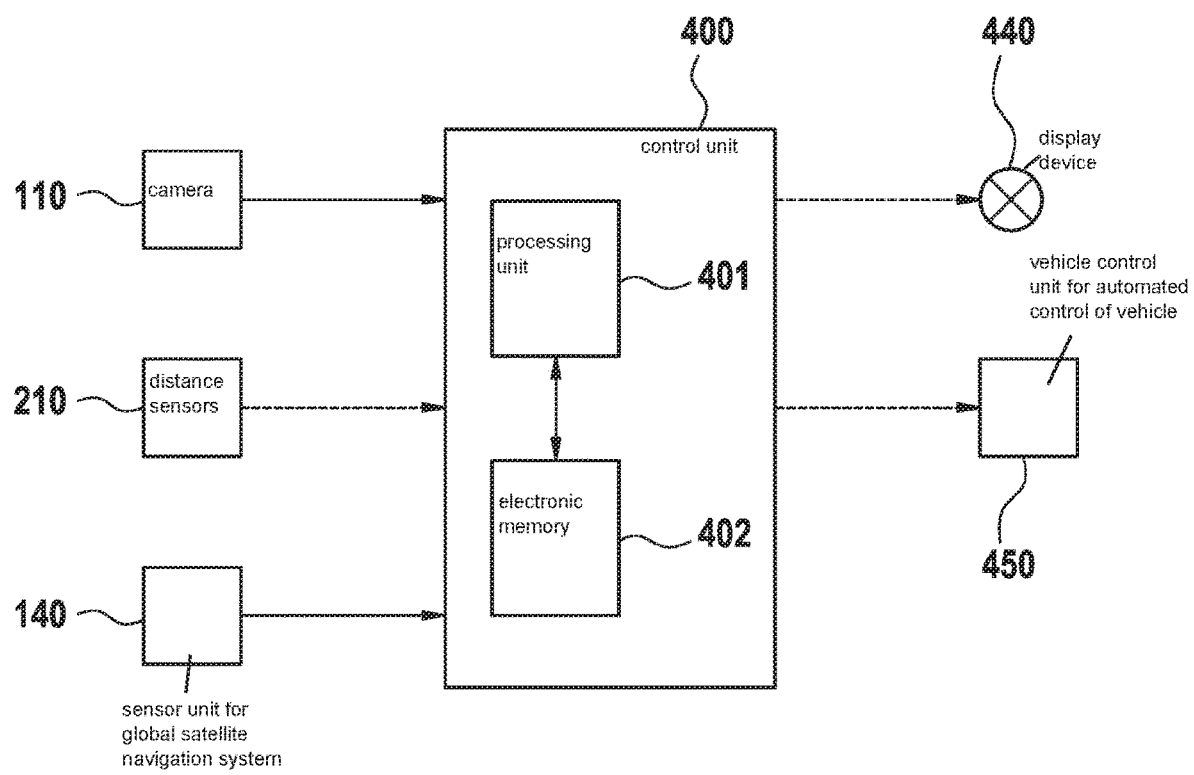
FIG. 4 shows a control unit.

FIG. 4 shows control unit 400 for carrying out the example method for the position determination. Control unit 400 receives or acquires at least one camera image 600 of environment 200 of vehicle 100 using the at least one camera 110 and preferably with the aid of a data cable. Using a processing unit 401, acquired camera image 600 is then transformed into an image 700, with transformed image 700 advantageously being a view of a virtual camera from an essentially perpendicular, downward-pointing virtual perspective 121 from an observer standpoint which is elevated relative to the road or a surface of a road section 130. It may be provided that only a subregion or subregions of acquired camera image 600 is/are transformed into transformed image 700. Alternatively or additionally, transformed image 700 may have scaling in comparison with acquired camera image 600, transformed image 700 in particular having a lower number of image points (pixels) in comparison with acquired camera image 600. Control unit 400 optionally or alternatively acquires distances between vehicle 100 and objects 220, 230 in environment 200 of vehicle 100 using ultrasonic sensors 210, and control unit 400 ascertains a depth map of environment 200 of vehicle 100 as a function of the acquired distances. Moreover, control unit 400 is able to ascertain contours of objects in environment 200 of vehicle 100 as a function of the acquired depth map. Control unit 400 also acquires a satellite position of vehicle 100 with the aid of sensor unit 140 through a satellite-based position determination, which is carried out with the aid of processing unit 401. Electronic memory 402 of control unit 400 stores satellite images 800 or aerial images 800. Control unit 400 supplies an aerial image 800 of environment 200 of vehicle 100 as a function of the acquired satellite position with the aid of the electronic memory, the provided satellite image 800 or aerial image 800 including a larger environment 200 of vehicle 100 than acquired camera images 600. Next, control unit 400 detects the position of transformed image 700 in supplied aerial image 800 using processing unit 401. The detection of the position of transformed image 700 in supplied aerial image 800 may be realized as a function of ascertained features of the image pixels or of the environment size of a pixel representing the environment, ascertained segments and/or ascertained objects and/or ascertained contours. Processing unit 401 ascertains a vehicle position 1000 and/or the orientation of vehicle 100 as a function of the detected position of transformed image 700 in supplied aerial image 800. In addition, control unit 400 is able to generate an output signal at an output interface, the output signal being configured to actuate display device 440 for the display of the vehicle position and/or the orientation of vehicle 100. Alternatively or additionally, the output signal may be configured to provide the vehicle position and/or the orientation to a vehicle control unit 450 for an automated control of vehicle 100, for example.

In an alternative or additional further development, the output signal may represent information for the successful determination of vehicle position 1000 as a function of the detected position of transformed image 700 in supplied aerial image 800. In this further development, if the determination of vehicle 1000 has been unsuccessful, for example, the output signal is configured to terminate a driver-assistance function of vehicle 100 or to generate a warning signal for the driver.

Figure 5:
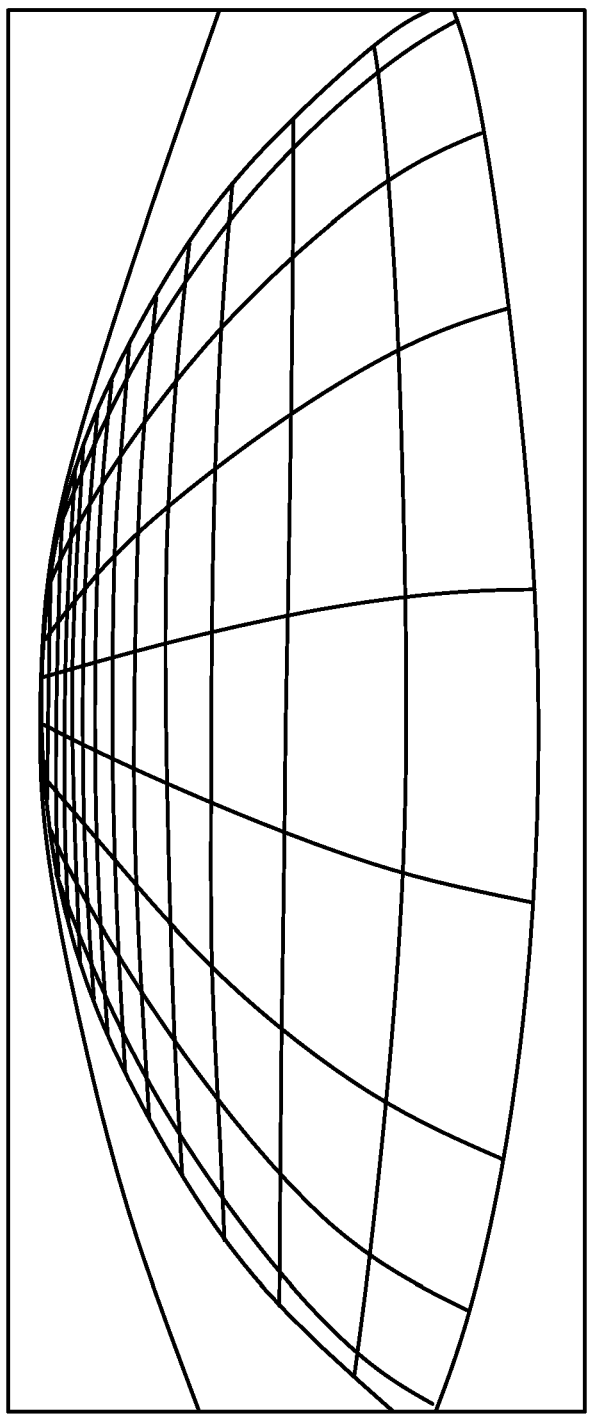
FIG. 5 shows a calibration of a camera for an ascertainment of the transformation matrix.

FIG. 5 shows a camera image 600 from a perspective 120 of a camera 110 which is situated on vehicle 100 and points toward the back in the driving direction. Camera 110 acquires a chess-board-like test pattern as camera image 600. Next, transformed image 700 is generated from a virtual perspective 121 as a function of camera image 600. Since an expected reference image of the chess-board-type test pattern from perspective 121 is able to be loaded from a memory of the control unit, or in other words, transformed image 700 is already known as a reference image, it is possible to ascertain the transformation matrix as a function of acquired camera image 600 and the reference image. The ascertainment of the transformation matrix is able to be carried out after the assembly of vehicle 100 or in the form of a calibration during the product service life by a repair shop or a dealer. Because of the separate ascertainment of the transformation matrix for each camera or for each vehicle 100, high accuracy of the ascertained vehicle is achieved despite the possible presence of production tolerances. The image later generated during the operation is more precise because of the ascertainment of the transformation matrix.

Figure 6:
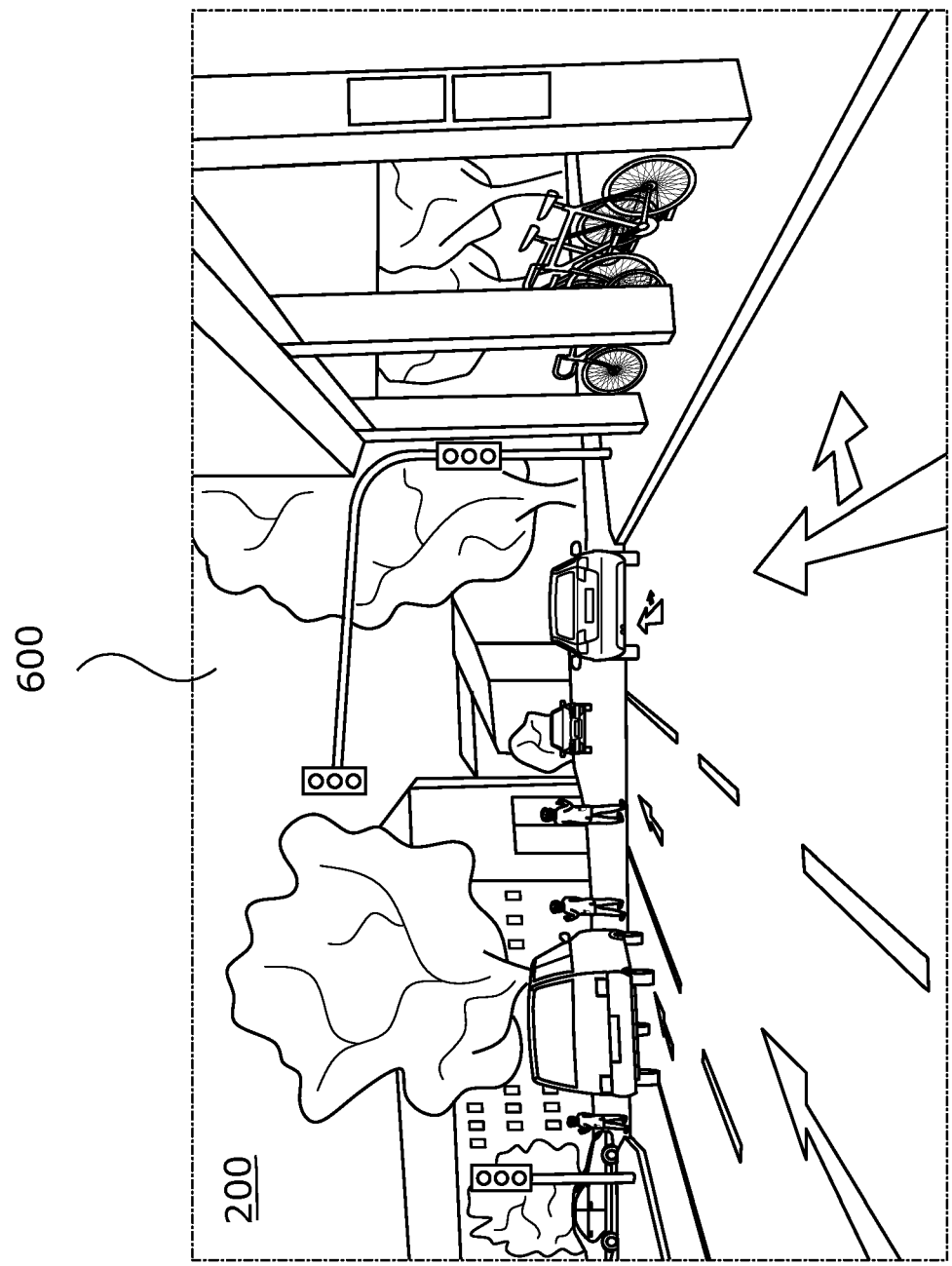
FIG. 6 shows a transformed image generated as a function of an acquired camera image.

FIG. 6 shows a camera image from a perspective 120 of a forward-pointing camera 110 of vehicle 100. Camera 110 detects an intersection in a city, with perspective 120 being similar to a driver perspective.

Figure 7:
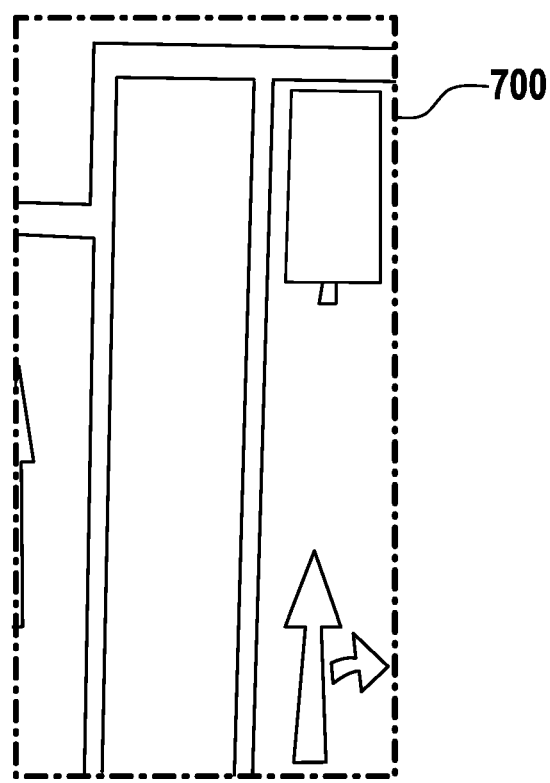
FIG. 7 shows a transformed image having an ascertained segment.

FIG. 7 shows a generated transformed image 700 by way of example, which is generated through computational transformation 113 as a function of camera image 600 from FIG. 6. Transformed image 700 is ascertained or generated only as a function of a subregion of camera image 600. In camera image 600 from FIG. 6 and/or transformed image 700 from FIG. 7, road markings such as directional arrows, and/or traffic light systems, trees and/or buildings are able to be computationally detected as objects and/or segments, e.g., sidewalks.

Figure 8:
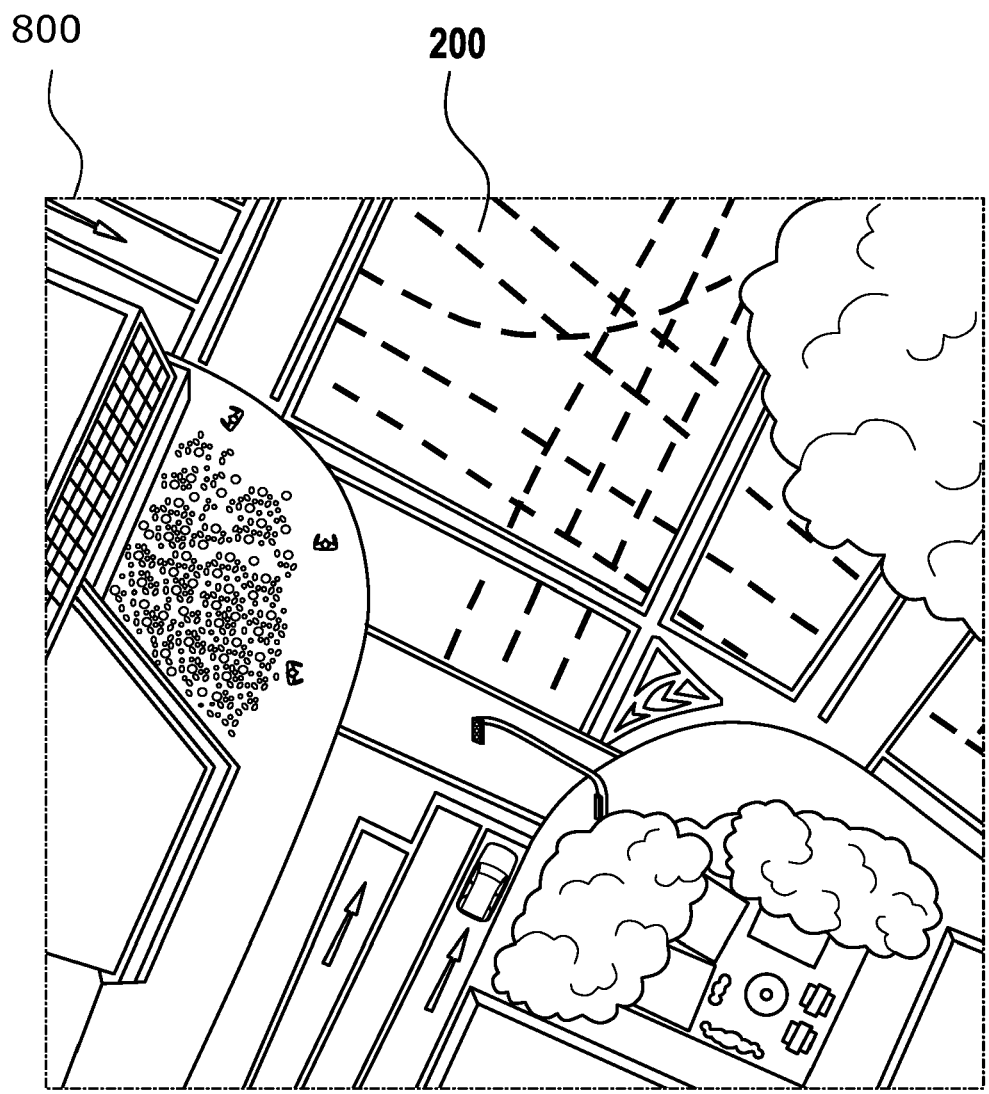
FIG. 8 shows an aerial image or satellite recording of an environment of the vehicle.

FIG. 8 shows an aerial image 800 or a satellite recording of an environment 200 of vehicle 100. Aerial image 800 is provided from an electronic memory 402 of control unit 400 as a function of a determined satellite position of vehicle 100, e.g., as a function of a satellite position determined by the GPS method, with the accuracy of a satellite position typically ranging from 1 to 10 meters.

Figure 9:
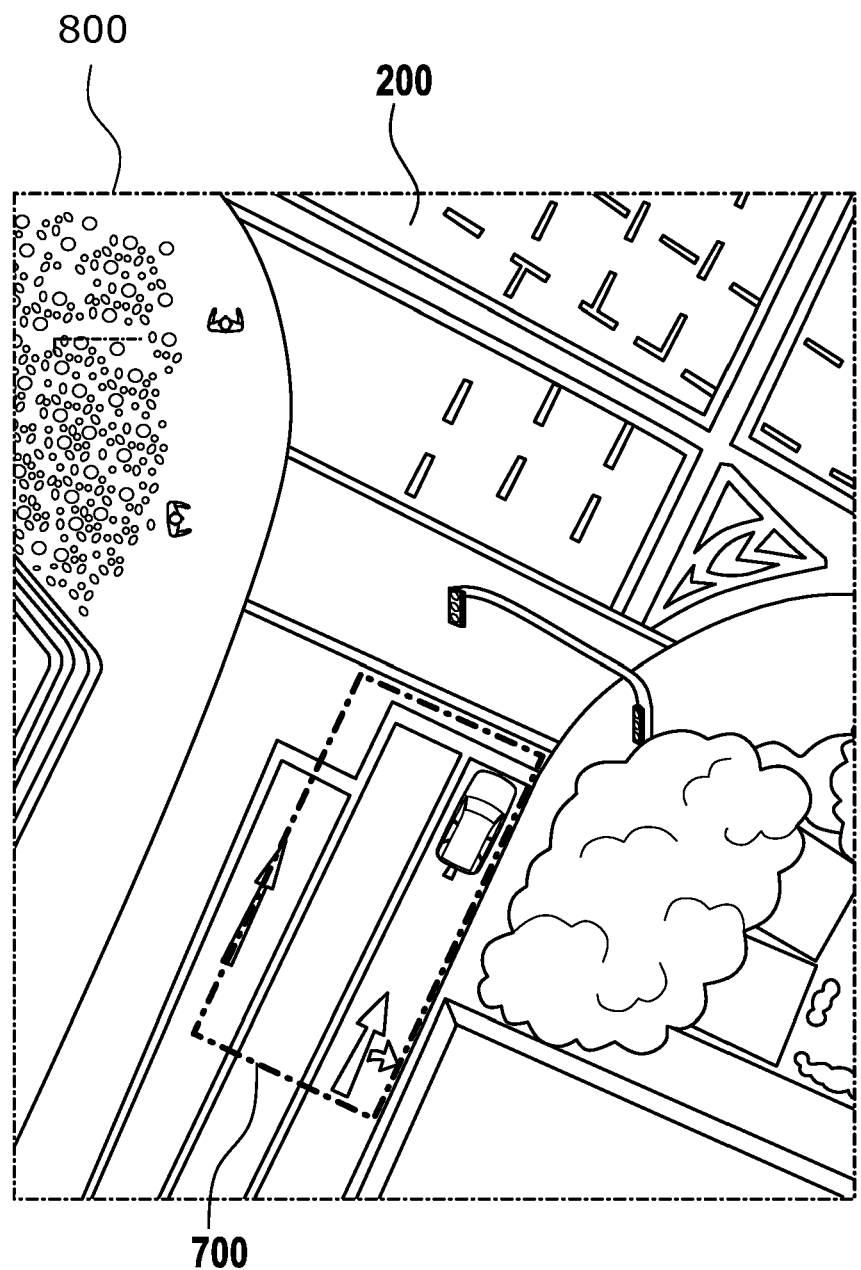
FIG. 9 shows a detected position of a transformed image in an aerial image.

FIG. 9 shows a detected position of transformed image 700 from FIG. 7 in aerial image 800 from FIG. 8. The position is detected as a function of the road markings, for example, the road markings in the camera image being ascertained as first objects or first segments, and/or being ascertained as second objects or second segments in transformed image 700 and aerial image 800.

Figure 10:
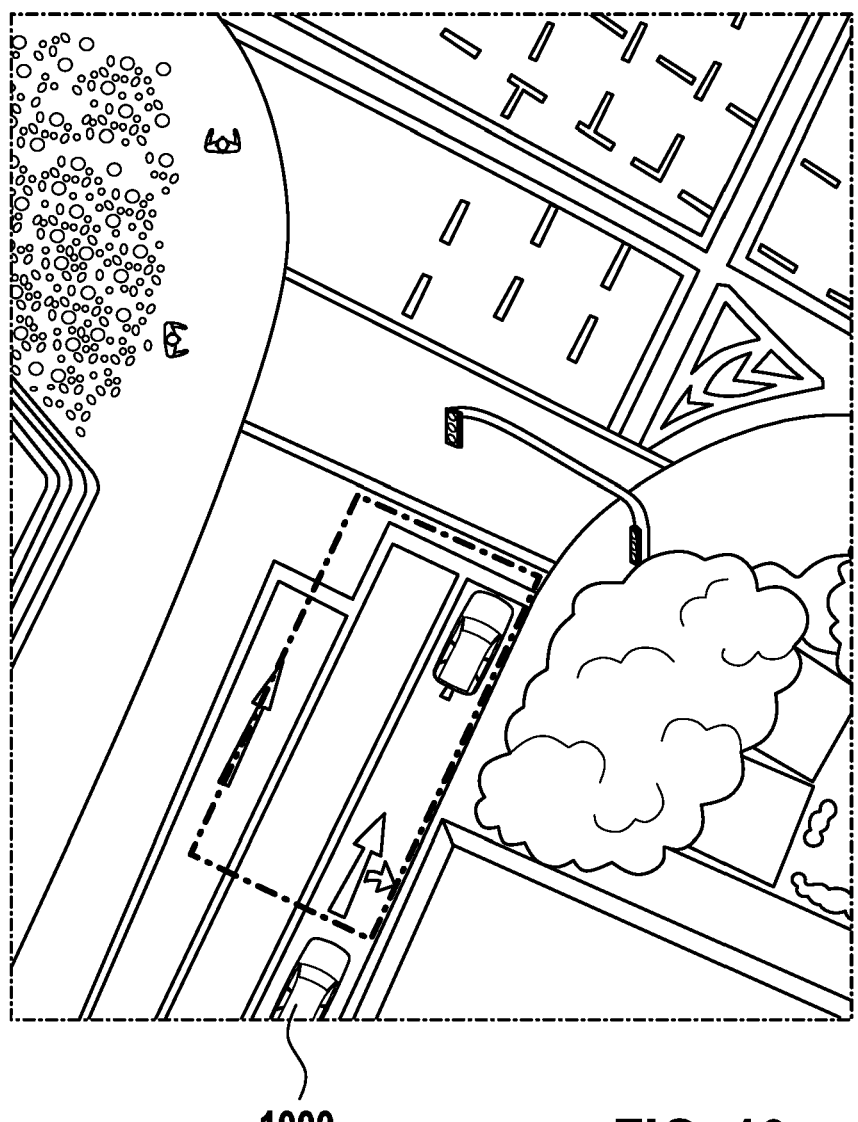
FIG. 10 shows an ascertained vehicle position.

In addition, the position between transformed image 700 and position 1000 of vehicle 100 is known. Local coordinates are furthermore allocated to the pixels of aerial image 800. It is therefore possible to ascertain vehicle position 1000 as a function of the detected position of transformed image 700 in aerial image 800. FIG. 10 shows an ascertained vehicle position 1000, in which case vehicle position 1000 is ascertained as a function of the detected position of transformed image 700 in aerial image 800. The error in vehicle position 1000 or the vehicle coordinates ascertained by the method according to the present invention is less than 1 meter, in particular less than 10 centimeters. The method according to the present invention thus determines a vehicle position 1000 more precisely than a satellite-based position determination.

What is claimed is:

1. A method for a position determination of a vehicle, at least one camera and one sensor unit for a global satellite navigation system being situated on the vehicle, the method comprising the following steps:
   acquiring at least one camera image of an environment of the vehicle using the camera;
   generating a transformed image as a function of at least one section of the acquired camera image, the transformed image having a changed observer standpoint, in comparison with the acquired camera image, which is located above the vehicle and has a downward-pointing virtual perspective onto the environment of the vehicle;
   determining a satellite position of the vehicle using a satellite-based position determination;
   supplying an aerial image of the environment of the vehicle as a function of the determined satellite position;
   detecting a position of the transformed image in the supplied aerial image; and
   ascertaining a position of the vehicle as a function of the detected position of the transformed image in the supplied aerial image,
   ascertaining features in the transformed image and the supplied aerial image, a feature being allocated to each pixel of the transformed image and the supplied aerial image, the feature describing a respective environment of the pixel, and
   detecting the position of the transformed image in the aerial image as a function of an allocation of at least two of the features ascertained in the transformed image to features ascertained in the aerial image.

2. The method as recited in claim 1, further comprising the following step:
   adapting the transformed image and/or the aerial image, the adaptation being performed by converting the transformed image and the aerial image (800) into a grayscale image, and/or by adapting a brightness of the aerial image to the transformed image.

3. The method as recited in claim 1, wherein the generation of the transformed image is carried out as a function of a digital terrain model of the environment of the vehicle, the terrain model being loaded as a function of the determined satellite position.

4. The method as recited in claim 1, further comprising the following steps:
   ascertaining first segments in the transformed image and second segments in the supplied aerial image by a segmentation method; and
   detecting the position of the transformed image in the aerial image as a function of an allocation of the at least one first segment to one of the second segments.

5. The method as recited in claim 1, further comprising the following steps:
   ascertaining first objects in the transformed image and second objects in the supplied aerial image using object detection; and
   detecting the position of the transformed image in the aerial image as a function of an allocation of at least one of the first objects to at least one of the second objects.

6. The method as recited in claim 5, further comprising the following steps:
   detecting a depth map of the environment of the vehicle using distance sensors, the distance sensors being configured to acquire a distance between the vehicle and objects in the environment;

ascertaining contours and/or objects in the environment of the vehicle as a function of the acquired depth map; and detecting the position of the transformed image in the aerial image as a function of an allocation of the ascertained contours in the depth map and/or of at least one of the objects ascertained in the depth map to at least one of the second objects and/or one of the second segments in the aerial image.

7. A control unit for a position determination of a vehicle, at least one camera and one sensor unit for a global satellite navigation system being situated on the vehicle, the control unit configured to acquire at least one camera image of an environment of the vehicle using the camera;

generate a transformed image as a function of at least one section of the acquired camera image, the transformed image having a changed observer standpoint, in comparison with the acquired camera image, which is located above the vehicle and has a downward-pointing virtual perspective onto the environment of the vehicle;

determine a satellite position of the vehicle using a satellite-based position determination;

supply an aerial image of the environment of the vehicle as a function of the determined satellite position;

detect a position of the transformed image in the supplied aerial image; and ascertain a position of the vehicle as a function of the detected position of the transformed image in the supplied aerial image, ascertaining features in the transformed image and the supplied aerial image, a feature being allocated to each pixel of the transformed image and the supplied aerial image, the feature describing a respective environment of the pixel, and detecting the position of the transformed image in the aerial image as a function of an allocation of at least two of the features ascertained in the transformed image to features ascertained in the aerial image.

8. The control unit as recited in claim 7, wherein the camera is an infrared camera.

9. The control unit as recited in claim 7, wherein the control unit is configured to generate an output signal, the output signal being configured to indicate the ascertained position of the vehicle and/or to supply the ascertained position of the vehicle to a vehicle control.

10. A vehicle, comprising:

at least one camera and one sensor unit for a global satellite navigation system situated on the vehicle; and a control unit for a position determination of a vehicle, the control unit configured to:

acquire at least one camera image of an environment of the vehicle using the camera;

generate a transformed image as a function of at least one section of the acquired camera image, the transformed image having a changed observer standpoint, in comparison with the acquired camera image, which is located above the vehicle and has a downward-pointing virtual perspective onto the environment of the vehicle;

determine a satellite position of the vehicle using a satellite-based position determination;

supply an aerial image of the environment of the vehicle as a function of the determined satellite position;

detect a position of the transformed image in the supplied aerial image; and ascertain a position of the vehicle as a function of the detected position of the transformed image in the supplied aerial image, ascertaining features in the transformed image and the supplied aerial image, a feature being allocated to each pixel of the transformed image and the supplied aerial image, the feature describing a respective environment of the pixel, and detecting the position of the transformed image in the aerial image as a function of an allocation of at least two of the features ascertained in the transformed image to features ascertained in the aerial image.

\* \* \* \* \*